3,192,250
SUBSTITUTED 2-NITROMETHYL - 4,10 - DIOXO-5-HYDROXY - 1,2,3,4,4a,9,9a,10 - OCTAHYDROANTHRACENES
Thomas Lynn Fields, Pearl River, N.Y., Raymond George Wilkinson, Montvale, N.J., and Andrew Steven Kende, Hartsdale, N.Y., assignors to American Cyanamid Company, Stamford, Conn., a corporation of Maine
No Drawing. Filed Oct. 22, 1962, Ser. No. 232,308
6 Claims. (Cl. 260—471)

This invention relates to new organic compounds and, more particularly, is concerned with novel substituted 2-nitromethyl-4,10-dioxo-5-hydroxy - 1,2,3,4,4a,9,9a,10 - octahydroanthracenes and to methods of preparing these novel compounds. The novel substituted 2-nitromethyl-4,10-dioxo-5-hydroxy - 1,2,3,4,4a,9,9a,10 - octahydroanthracenes of the present invention may be represented by the following general formula:

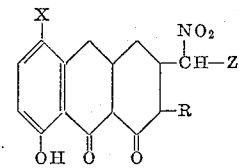

wherein X is hydrogen or halogen, R is hydrogen, carboxy, lower carbalkoxy or phenyl lower carbalkoxy, and Z is hydrogen, lower carbalkoxy or lower alkanoyl. Suitable lower carbalkoxy groups contemplated by the present invention are those having up to about 6 carbon atoms with carbomethoxy and carbethoxy being preferred. Suitable lower alkanoyl groups contemplated by the present invention are those having up to about 6 carbon atoms with acetyl being preferred. Suitable phenyl lower carbalkoxy groups are, for example, carbobenzyloxy and carbophenethoxy. Halogen is exemplified by chlorine and bromine. It is to be understood that the novel compounds of the present invention may theoretically exist in other tautomeric forms.

The novel compounds of the present invention are particularly useful as chelating, complexing or sequestering agents for polyvalent metallic ions. The complexes formed with polyvalent metallic ions are particularly stable and usually quite soluble in various organic solvents. This, of course, makes them useful for a variety of purposes such as in biological experimentation where the removal of traces of polyvalent metallic ions may be of great importance. They are also useful in analyses for polyvalent metallic ions which may be complexed and extracted by means of these reagents. Other uses common to sequestering agents are also apparent from these compounds.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water. The novel compounds of the present invention are biologically active and have been found to possess antibacterial activity. The minimal inhibitory concentrations, expressed in gammas per milliliter, of four typical compounds of the present invention against *Staphylococcus aureus* when measured by a standard turbidimetric procedure are set forth in the following table:

TABLE I

| Compound | Minimal inhibitory conc. in γ/ml. |
|---|---|
| 3-Carbobenzyloxy-8-chloro-2-(1-nitroacetonyl)-4,10-dioxo-5-hydroxy-1,2,3,4,4a,9,9a,10-octahydroanthracene | 0.245 |
| 3-Carboxy-8-chloro-2-(1-nitroacetonyl)-4,10-dioxo-5-hydroxy-1,2-3-4-4a,9,9a,10-octahydroanthracene | 1.021 |
| 3-Carbobenzyloxy-8-chloro-2-nitromethyl-4,10-dioxo-5-hydroxy-1,2,3,4,4a,9,9a,10-octahydroanthracene | 0.025 |
| 3-Carboxy-8-chloro-2-nitromethyl-4,10-dioxo-5-hydroxy-1,2,3,4,4a,9,9a,10-octahydroanthracene | 0.475 |

Furthermore, the 3-carbobenzyloxy-8-chloro-2-nitromethyl-4,10-dioxo-5-hydroxy-1,2,3,4,4a,9,9a,10 - octahydroanthracene inhibits the growth of *Mycobacterium ranae* at a concentration of 15 γ/ml. and inhibits the growth of *Staphylococcus aureus* 209P at a concentration of 62γ/ml.

The novel compounds of the present invention may also be useful in the synthesis of physiologically active antibiotics of the tetracycline series. For example, when Z is hydrogen and R is lower carbalokxy or phenyl lower carbalkoxy in the general formula set forth above, these novel compounds of the present invention may be converted by standard hydrolytic procedures to the intermediate 2-nitromethyl-3-carboxy - 4,10 - dioxo - 5 - hydroxy-1,2,3,4,4a,9,9a,10-octahydroanthracenes. The intermediates may then be converted to the corresponding acyl halides by treatment with a suitable agent such as oxalyl chloride or thionyl chloride, or alternatively, the mixed carboxylic-carbonic anhydride derivative may be prepared in the usual manner. The corresponding acyl malonate may then be prepared by treating the intermediate acyl derivative with sodium or magnesium diethylmalonate. The acyl malonate may then be cyclized with a strongly basic condensing agent such as sodium hydride, sodium metal, an alkali metal alkoxide, or the like, to the ethyl ester of the corresponding 4-nitro-1,2,3,4,4a,5,5a,6,11,11a, 12,12a-dodecahydro-1,3,11,12 - tetraoxo - 10 - hydroxy-naphthacene-2-carboxylic acids. These dodecahydronaphthacenes may then be reduced and methylated to give the 4-dimethylamino derivative, which may in turn be treated to remove the carbethoxy group by strong acid hydrolysis, or may be converted to the 2-carboxamido derivative by treating with alcoholic ammonia at 70° C.–110° C. in a sealed vessel.

The novel compounds of the present invention wherein R is hydrogen and Z is lower carbalkoxy or lower alkanoyl in the general formula set forth above, may also be converted to physiologically active antibiotics of the tetracycline series in the following manner. The nitro group is first reduced to an amino group and methylated by standard reductive alkylation procedures. This is followed by hydrolysis of the lower carbalkoxy or lower alkanoyl group by standard hydrolytic procedures to the intermediate 4,10-dioxo-5-hydroxy-1,2,3,4,4a,9,9a,10-octa-hydro-2-anthrylglycines. These intermediates may then be converted to the corresponding acyl halides by treatment with a suitable agent such as oxalyl chloride or thionyl chloride, or alternatively, the mixed carboxylic-carbonic anhydride derivative may be prepared in the usual manner. The corresponding acyl malonate may then be prepared by treating the intermediate acyl derivative with sodium or magnesium diethylmalonate. The acyl malonate may then be cyclized with a strongly basic condensing agent such as sodium hydride, sodium metal, an alkali metal alkoxide, or the like, to the ethyl ester of the corresponding 4-dimethylamino - 1,2,3,4,4a,5,5a,6,11,11a, 12,12a - dodecahydro - 1,3,11,12 - tetraoxo - 10 - hydroxynaphthacene-2-carboxylate. These dodecahydronaphthacenes may then be treated to remove the carbethoxy group by strong acid hydrolysis or may be converted to the 2-carboxamido derivative by treating with alcoholic ammonia at 70° C.–110° C. in a sealed vessel.

The novel compounds of the present invention may be prepared by the Michael addition of a nitromethane derivative of the general formula:

wherein Z is as hereinabove defined, to a 1,4,4a,9,9a,10-hexahydro-4,10-dioxo-5-hydroxyanthracene of the general formula:

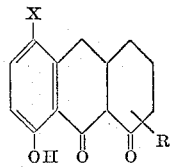

wherein X and R are as hereinabove defined. The 1,4, 4a,9,9a,10 - hexahydro - 4,10 - dioxo - 5 - hydroxyanthracenes of the above general formula where R is carboxy, lower carbalkoxy or phenyl lower carbalkoxy are disclosed and claimed in our copending application Serial No. 155,484, filed November 28, 1961. The 1,4,4a,9,9a, 10-hexahydro-4,10-dioxo - 5 - hydroxyanthracenes may be readily prepared by a series of reactions starting with the 5-hydroxy-1,2,3,4-tetrahydro - 4 - oxonaphthalene-2-acetaldehydes disclosed and claimed in the copending application of Raymond G. Wilkinson et al., Serial No. 821,093, filed June 18, 1959, now Patent No. 3,102,914. The 5-hydroxy-1,2,3,4-tetrahydro - 4 - oxonaphthalene - 2-acetaldehyde is first converted to the diethyl 5-hydroxy-1,2,3,4-tetrahydro - 4 - oxo - 2 - naphthylethylidene malonate by treatment with diethyl malonate. This malonic ester is then subjected to a Diels-Alder condensation with cyclopentadiene whereby the corresponding cyclopentadiene adduct is obtained. Treatment of the crude cyclopentadiene adduct with sodium hydride in refluxing toluene gives the desired 1,4,4a,9,9a,10-hexahydro-4,10-dioxo-5-hydroxy-anthracene.

The Michael addition whereby the novel compounds of the present invention are prepared is preferably carried out in an anhydrous solvent such as ethanol, benzene, toluene, diethyl ether, or the like, with a strongly basic condensing agent such as sodium hydride, sodium metal, an alkali metal alkoxide, or the like. The reaction may be carried out over a wide range of temperatures limited, in general, only by the properties of the solvent, over a period of time of from as little as 10 minutes to about 12 hours or more.

The invention will be described in greater detail in conjunction with the following specific examples.

*Example 1.—8-chloro-1,4,4a,9,9a,10-hexahydro-4,10-dioxo-5-hydroxyanthracene*

A solution of diethyl 8-chloro-1,2,3,4-tetrahydro - 5-hydroxy - 4 - oxo - 2 - naphthylidene malonate (15.0 g.) and 8 ml. of freshly distilled cyclopentadiene in 10 ml. of toluene was placed in a bomb and heated to 150° C. for 20 hours. Evaporation of the toluene in vacuo gave a brown oil. This crude Diels-Alder adduct was dissolved in 20 ml. of dry toluene, 10 g. of 50% sodium hydride dispersion was added, and the stirred suspension slowly brought to reflux under a nitrogen atmosphere. After three hours the ultraviolet absorption peak had shifted to a dissymmetric peak with maximum at 349 mμ and considerable absorption between 350 and 370 mμ. The cooled reaction mixture was cautiously acidified by the gradual addition of glacial acetic acid followed by the addition of 300 ml. of ethanol-ethyl acetate. The organic layer was washed with water, dilute sodium bicarbonate solution and then dried over anhydrous magnesium sulfate. Evaporation of the solvent gave a yellow oil. Chromatography of this material on silica gel, using benzene as the eluent, gave 1.12 g. of 8-chloro-1,4,4a, 9,9a,10-hexahydro-4,10, - dioxo - 5 - hydroxyanthracene, M.P. 150–151° C.; and also some ethyl 10-chloro-1,4, 11,11a,12,12a-hexahydro-5,7-dihydroxy-6-oxo - 1,4 - methanonaphthacene - 4a(6H) - carboxylate.

*Example 2.—3 - carbobenzyloxy - 8 - chloro - 2 - (1 -nitroacetonyl) - 4,10 - dioxo - 5 - hydroxy - 1,2,3,4,4a,9,9a, 10 - octahydroanthracene*

To a stirred solution of benzyl 8-chloro-5-hydroxy-1,4, 4a,9,9a,10-hexahydro-4,10-dioxo-anthracene - 3 - carboxylate (100 mg.) in dry toluene (8 ml.), under a nitrogen atmosphere, was added 50 mg. of a 50% sodium hydride in oil suspension followed immediately by 100 mg. of nitroacetone. The mixture was stirred at room temperature for one hour. The reaction mixture was acidified by the cautious addition of glacial acetic acid. After dilution with 10 ml. of toluene the solution was washed with 1 N hydrochloric acid and 4 times with water. The dried solution was concentrated to an oily residue. Crystallization from ether gave a yellow crystalline product; yield 42 mg.; M.P. 153–158° C.

*Example 3.—3 - carboxy - 8 - chloro - 2 - (1 - nitroacetonyl) - 4,10 - dioxo - 5 - hydroxy - 1,2,3,4,4a,9,9a,10-octahydroanthracene*

3 - carbobenzyloxy - 8 - chloro - 2 - (1-nitroacetonyl)-4,10-dioxo-5-hydroxy - 1,2,3,4,4a,9,9a,10 - octahydroanthracene (100 mg.) was dissolved in 20 ml. of methyl Cellosolve with the aid of heat. The solution was cooled in an ice bath, flushed with nitrogen and 20 mg. of 10% palladium on carbon was added. Hydrogen was then bubbled through the system at a vigorous rate and the effluent gases were passed into a solution of barium hydroxide. After 1.5 hours no barium carbonate precipitate was observed. The system was flushed with nitrogen and the catalyst was removed by filtration. The solvent was removed by evaporation under vacuum, the temperature of the solution being maintained at or below room temperature. Trituration of the residual yellow gum with ether yielded 31 mg. of analytically pure 3-carboxy-8-chloro - 2 - (1 - nitroacetonyl) - 4,10-dioxo-5-hydroxy-1, 2,3,4,4a,9,9a,10 - octahydroanthracene; M.P. 135° C. with the evolution of gas.

*Example 4.—8 - chloro - 2 - (1 - nitroacetonyl)-4,10-dioxo - 5 - hydroxy - 1,2,3,4,4a,9,9a,10 - octahydroanthracene*

3 - carbobenzyloxy - 8 - chloro - 2 - (1 - nitroacetonyl)-4,10 - dioxo - 5 - hydroxy - 1,2,3,4,4a,9,9a,10 - octahydroanthracene (100 mg.) was dissolved in 15 ml. of methyl Cellosolve with warming. 15 mg. of 10% palladium on carbon was added and the mixture subjected to a hydrogen atmosphere for two hours. The catalyst was filtered off and the solvent was removed in vac. with gentle warming. Recrystallization of the pale yellow solid from 5 ml. of ether gave 30 mg. of analytically pure 8-chloro-2-(1 - nitroacetonyl) - 4,10 - dioxo - 5 - hydroxy - 1,2,3,4, 4a,9,9a,10-octanhydroanthracene; M.P. 179–181° C.

*Example 5.—Ethyl (3 - carbobenzyloxy - 8 - chloro - 4, 10 - dioxo - 5 - hydroxy - 1,2,3,4,4a,9,9a,10 - octahydro-2 - anthryl)nitroacetate*

To a stirred solution of benzyl 8-chloro-5-hydroxy-1,4, 4a,9,9a,10 - hexahydro - 4,10 - dioxo - anthracene-3-carboxylate (100 mg) in 7 ml. of sodium dried toluene, under a nitrogen atmosphere, was added 50 mg. of a 50% sodium hydride in oil suspension followed immediately by 0.14 ml. of ethyl nitroacetate. The mixture was stirred at room temperature for two hours, by which time no significant quantity or starting material could be detected by ultraviolet spectrum. The reaction mixture was acidified by the cautious addition of glacial acetic acid. After dilution with ethyl acetate the solution was washed with 1 N hydrochloric acid and twice with water. The dried solution was concentrated to a yellow oil in vac. All attempts at crystallization were unsuccessful. The crude oil was purified by chromatography on silica gel (100–200 mesh) using benzene: petroleum ether (9:1) as eluent. The nitroacetate adduct was characterized by its infrared and ultraviolet spectra.

*Example 6.—3 - carbobenzyloxy - 8 - chloro - 2 - nitromethyl - 4,10 - dioxo - 5 - hydroxy - 1,2,3,4,4a,9,9a,10-octahydroanthracene*

To a stirred solution of benzyl 8-chloro-5-hydroxy-1,4,4a,9,9a,10-hexahydro-4,10-dioxo-anthracene - 3 - carboxylate (300 mg.) is 10 ml. of sodium dried toluene, under a nitrogen atmosphere, was added 105 mg. of a 50% sodium hydride in oil suspension followed immediately by 0.3 ml. of nitromethane. The mixture was stirred at room temperature for 1.5 hours. The reaction mixture was acidified by the cautious addition of glacial acetic acid. After dilution with ethyl acetate the solution was washed with 20 ml. of 1 N hydrochloric acid and twice with water. The dried solution was concentrated to a gum in vac. which was triturated with 5 ml. of ether. The yield of crystalline 3-carbobenzyloxy-8-chloro-2-nitromethyl - 4,10 - dioxo - 5 - hydroxy - 1,2,3,4,4a,9,9a,10-octahydroanthracene was 160 mg.; M.P. 163–165° C.

*Example 7.—3 - carboxy - 8 - chloro - 2 - nitromethyl - 4,10 - dioxo - 5 - hydroxy - 1,2,3,4,4a,9,9a,10 - octahydroanthracene*

3 - carbobenzyloxy - 8 - chloro - 2 - nitromethyl - 4,10-dioxo - 5 - hydroxy - 1,2,3,4,4a,9,9a,10 - octahydroanthracene (150 mg.) was dissolved in 50 ml. of methyl Cellosolve with the aid of heat. The solution was cooled in an ice bath, flushed with nitrogen, and 30 mg. of 10% palladium on carbon was added. Hydrogen was then bubbled through the system at a vigorous rate and the effluent gases were passed into a solution of barium hydroxide. After two hours no barium carbonate precipitate was observed. The system was flushed with nitrogen and the catalyst was removed by filtration. The solvent was removed by evaporation under vacuum, the temperature of the solution being maintained at or below room temperature. The residual pale yellow solid was slurried in ether, collected in a filter and dried in vac. at room temperature. The yield of 3-carboxy-8-chloro-2 - nitromethyl - 4,10 - dioxo - 5 - hydroxy - 1,2,3,4,4a,9,9a,10 - octahydronathracene acid was 70 mg.; M.P. 142° C. with the evolution of gas.

What is claimed is:
1. A compound selected from the group consisting of those of the formula:

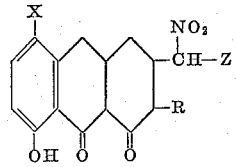

wherein X is selected from the group consisting of hydrogen, chlorine and bromine, R is selected from the group consisting of hydrogen, carboxy, lower carbalkoxy and phenyl lower carbalkoxy, and Z is selected from the group consisting of hydrogen, lower carbalkoxy and lower alkanoyl, and tautomers thereof.

2. 3 - carbobenzyloxy - 8 - chloro - 2 - (1 - nitroacetonyl) - 4,10 - dioxo - 5 - hydroxy - 1,2,3,4,4a,9,9a,10 - octahydroanthracene.

3. 3 - carboxy - 8 - chloro - 2-(1 - nitroacetonyl) - 4,10-dioxo - 5 - hydroxy - 1,2,3,4,4a,9,9a,10 - octahydroanthracene.

4. Ethyl (3 - carbobenzyloxy - 8 - chloro - 4,10 - dioxo-5 - hydroxy - 1,2,3,4,4a,9,9a,10 - octahydro - 2 - anthryl)-nitroacetate.

5. 3 - carbobenzyloxy - 8 - chloro - 2 - nitromethyl-4,10-dioxo - 5 - hydroxy - 1,2,3,4,4a,9,9a,10-octahydroanthracene.

6. 3 - carboxy - 8 - chloro - 2 - nitromethyl - 4,10-dioxo - 5 - hydroxy - 1,2,3,4,4a,9,9a,10 - octahydroanthracene.

References Cited by the Examiner
UNITED STATES PATENTS
3,002,993   10/61   Wilkinson et al. _____ 260—558

LEON ZITVER, *Primary Examiner.*
DANIEL D. HORWITZ, *Examiner.*